United States Patent

Sampson

[11] 4,208,798
[45] Jun. 24, 1980

[54] BRAKE INSTALLATION TEMPLATE

[75] Inventor: Ernest C. Sampson, Milford, Mich.

[73] Assignee: Eaton Corporation, Cleveland, Ohio

[21] Appl. No.: 61,579

[22] Filed: Jul. 30, 1979

[51] Int. Cl.² .............................................. G01B 3/30
[52] U.S. Cl. ............................ 33/180 AT; 33/174 G;
33/452; 188/196 R
[58] Field of Search ....... 33/180 AT, 181 AT, 180 R,
33/181 R, 174 G, 452; 188/196 R

[56] References Cited

U.S. PATENT DOCUMENTS

| 2,003,556 | 6/1935 | Saballus | 33/180 AT |
| 2,930,136 | 3/1960 | Knudsen et al. | 33/181 AT |
| 3,854,216 | 12/1974 | Mosher | 33/181 AT |

Primary Examiner—William D. Martin, Jr.
Attorney, Agent, or Firm—R. J. McCloskey; H. D. Gordon

[57] ABSTRACT

A multi-member, variable configuration template (100) is provided as an aid for determining acceptable brake assembly mounting variables for an air operated, cam actuated brake assembly to be mounted on a vehicle of known configuration. The template comprises a first member (102) corresponding to the brake spider, a second member (104) corresponding to the air chamber mounting bracket, a third member (106) corresponding to the air chamber and a fourth member (108) corresponding to the slack adjuster. The second and fourth members are pivotably connected to the first member about a point (110) corresponding to the axis of the brake actuating cam, the third member is slidably mounted on the second member and the third member is removably connectable to the fourth member at a series of points on the fourth member. Various arrays (112, 116, 120 and 124) are provided to determine the brake assembly mounting variables corresponding to a particular template configuration.

18 Claims, 3 Drawing Figures

BRAKE INSTALLATION TEMPLATE

BACKGROUND OF THE INVENTION

1. Field of the Invention

The present invention relates to a multi-member template usable as an aid in determining brake assembly mounting variables acceptable for use in connection with a brake assembly to be mounted on a vehicle of a particular configuration. In particular, the present invention relates to a multi-member, variable configuration template for determining the acceptable and/or optimal brake assembly mounting variables for an air operated, cam actuated brake assembly comprising a brake spider, a slack adjuster, an air chamber and an air chamber mounting bracket to be mounted on a particular vehicle, such as a heavy-duty truck or the like.

2. Description of the Prior Art

It is well known that for certain types of vehicles, such as heavy-duty trucks utilizing pressurized air operated, cam actuated brakes, the space available for installing the brake assembly and for permitting interference free operation of the brakes, i.e. the brake assembly mounting envelope, is often quite limited, of an irregular shape and/or often varies considerably from vehicle to vehicle as each vehicle, or group of vehicles, is often unique as to suspension types, axle housings, frame members and the like. In the past, determining acceptable and/or optimal brake assembly mounting variables for a brake assembly to be mounted on a particular vehicle, such as spider index angles, air chamber bracket mounting angles, etc., was a time-consuming task often performed on a trial and error basis by drawing various brake assemblies in various configurations on a scale drawing of the particular vehicle. This was especially true as most commerically available brake assembly components permit only a limited number of predetermined variations, for example, one manufacturer supplies standard slack adjusters in lengths of 5.0, 5.5, 6.0 and 6.5 inches only.

SUMMARY OF THE INVENTION

In accordance with the present invention, the drawbacks of the prior art have been overcome to the extent that a multi-piece, variable configuration template is provided which will allow a designer having a scale drawing of a vehicle to quickly and easily determine the acceptable and/or optimal brake assembly mounting variables for the brake assembly to be mounted on the vehicle. The above is accomplished by providing a multi-piece, variable configuration template, preferably of a relatively thin, relatively clear or translucent material, such as sheet plastic or plexiglass. Each piece or member of the template is in the shape of the two dimensional outline of a member of the brake assembly and/or has the outline of a member of the brake assembly, such as the brake spider, the slack adjuster, the air chamber mounting bracket and the air chamber, marked thereon. The template members representing members of the brake assembly are of the same scale as the scale drawing of the vehicle to be utilized by the designer. The template members representing the shape of the air chamber mounting bracket and the slack adjuster are rotatably mounted to the template member representing the shape of the spider at the point thereof corresponding to the axis of rotation of the actuating cam. The template member representing the shape of the air chamber is slidably mounted to the template member representing the air chamber mounting bracket and is removably mountable to the template member representing the slack adjuster at various points representing various slack adjuster lengths. The template member representing the slack adjuster, when connected to the template member representing the air chamber, will represent the position of the slack adjuster in the fully extended condition of the air chamber. The various template members carry indicia marks indicating the relative assembly mounting variables at which the members are set and preferably will also carry indicia marks indicating the settings of the variables corresponding to commercially available standard variable settings. Preferably, the indicia marks will be readable on either side of the template. To utilize the template, the slack adjuster length, which is usually determined by the torque requirements of the brake, will be set on the template and then the template is laid over a scale drawing of space available in a particular vehicle for the brake assembly. The various members of the template are then manipulated to provide a combination or combinations of settings of brake assembly mounting variables which will permit installation and operation of the brake assembly while corresponding to commercially available settings. The value of the settings is quickly determined by reference to the indicia marks. In situations where more than one combination of settings is acceptable, that combination permitting greatest ease of installation and/or maintenance is usually considered optimal.

Accordingly, it is an object of the present invention to provide a new and improved multi-member, variable configuration template for determination of acceptable and/or optimal brake assembly mounting variables for a brake assembly to be mounted on a particular vehicle.

These and other objects and advantages of the present invention will become apparent from a reading of the detailed description of the preferred embodiment taken in connection with the attached drawings.

DESCRIPTION OF THE PREFERRED EMBODIMENT

Figure 1:
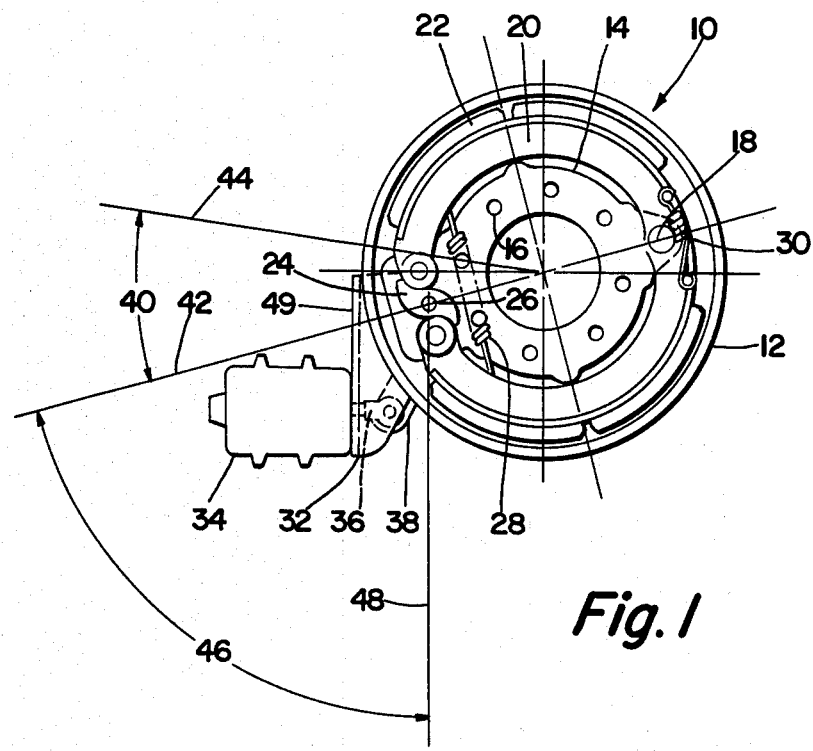
FIG. 1 is an illustration of a typical air operated, cam actuated expanding shoe brake assembly.
Figure 2:
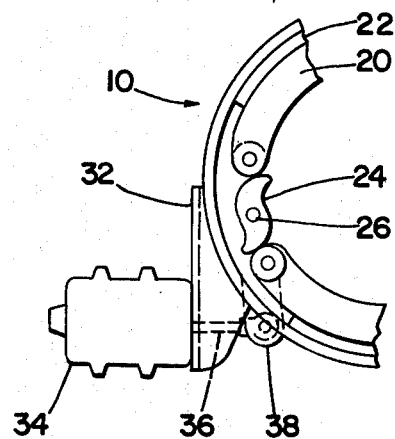
FIG. 2 is a partial view of the brake assembly of FIG. 1 illustrating the brake assembly in the fully applied position.

A typical air operated, cam actuated expanding shoe brake assembly 10 is illustrated in FIGS. 1 and 2. The brake assembly 10 will cooperate with a generally annular rotatable brake drum 12 to decelerate or stop a vehicle as is well known in the art. The brake assembly 10 comprises a brake support member or spider 14 which is non-rotatably secured to the vehicle, usually to the axle housing, by suitable fasteners 16, a brake shoe pivot, or anchor pin 18 secured to the brake spider 14 and a pair of opposed, generally arcuate brake shoes 20. A suitable lining of friction material 22 is secured to the shoes 20 for selective engagement with the drum 12. A brake actuating cam element, such as an "S" cam 24, is secured to the cam shaft 26 which is rotatably mounted in the spider 14. Brake shoe return spring 28 will maintain the shoes against the cam while brake shoe retaining springs 30 will maintain the shoes against the anchor pin. Of course, the template of the present invention may also be used in connection with brake assemblies of the twin anchor pin construction.

The brake assembly 10 also includes an air chamber mounting bracket 32 which is mounted to the spider about the axis of the cam shaft 26. Secured to the bracket 32 is an air motor, or air chamber, 34. As is well known in the art, air chamber 34 is connected to a source of selectively supplied pressured air and will produce an oscillatory movement to link member 36 which is pivotably connected to the lever body of a slack adjuster 38 which is secured to the cam shaft 26 for rotation thereof. As is well known, various types of automatic or manual slack adjusters, or even simple levers, may be utilized in combination with a given brake spider, air chamber and air chamber mounting bracket and all such devices are intended to fall within the meaning of the term slack adjuster as used herein.

The structural features of the brake assembly 10 and the slack adjuster 38 are generally known in the prior art and may be appreciated in greater detail by reference to U.S. Pat. Nos. 3,497,037 and 3,507,369, both of which are hereby incorporated by reference.

As may be seen by reference to FIG. 2, when air is introduced under pressure into air chamber 34, link member 36 is caused to move to the right thereby pivoting slack adjuster lever 38 and cam shaft 26. Pivoting of the cam shaft 26 causes cam 24 to rotate thereby causing shoes 20 to expand radially outwardly to bring the friction material 22 into contact with the drum 12.

As is well known, the space in certain types of vehicles for mounting the brake assembly and allowing non interferring operation thereof, i.e. the brake assembly mounting envelope, often varies considerably from vehicle to vehicle and is often severely limited and/or of an irregular shape. To accommodate this situation, many brake assembly manufacturers and/or suppliers often offer the vehicle manufacturer a choice of mounting hole locations for the spider to provide variable spider index angles relative to the vehicles, a choice of angles at which the air chamber mounting brackets may be mounted to the spider and/or, a choice of slack adjuster lengths (the length of slack adjuster is usually determined by the torque requirement of the brake and thus is fixed for a particular vehicle). The above choices, or variables, some of which are usually finite in number, are herein collectively referred to as the "brake assembly mounting variables", and must be specified when ordering a brake assembly from the brake manufacturer and/or supplier.

By way of example, in a possible system of brake assembly mounting variables, the angle 40 defined by datum line 42 extending through the axis of the cam shaft 26, and axis 45 of the vehicle axle shaft and the axis of anchor pin 18 and a line 44 extending from the axle shaft axis 45 and through the center of the first fastener 16 clockwise from the cam shaft 26 is referred to as the spider index angle and defines the angular relationship of the spider to the vehicle. Of course, it is understood that the angular relationship between the spider and the vehicle can be defined by setting forth the angular relationship between any defined line on the spider and any defined datum line fixed relative to the vehicle. The angle 46 between a line 48 parallel to the relatively flat face 49 of bracket 32 on which air chamber 34 is mounted and line 42 referred to above is referred to as the air chamber bracket mounting angle and defines the angular relationship between the air chamber mounting bracket 32 and spider 14. The angular relationship between the air chamber bracket 32 and the spider 14 may, of course, be defined by setting forth the angle between a defined line on the bracket and a defined line on the spider. The linear distance between the axis of cam shaft 26 and the pivotal connection of the slack adjuster 38 to the link member 36 is commonly referred to as the slack adjuster length. The slack adjuster length will also determine the position on the flat face 49 of bracket 32 that the air chamber 34 is mounted to the air chamber bracket.

The position of the slack adjuster lever 38 in the fully applied position of the brake may be seen by reference to FIG. 2. A sufficient amount of space to allow for interference-free travel of the slack adjuster from the position shown in FIG. 1 to the position shown in FIG. 2 must, of course, be provided to assure for proper interference free operation of the brake assembly.

Figure 3:
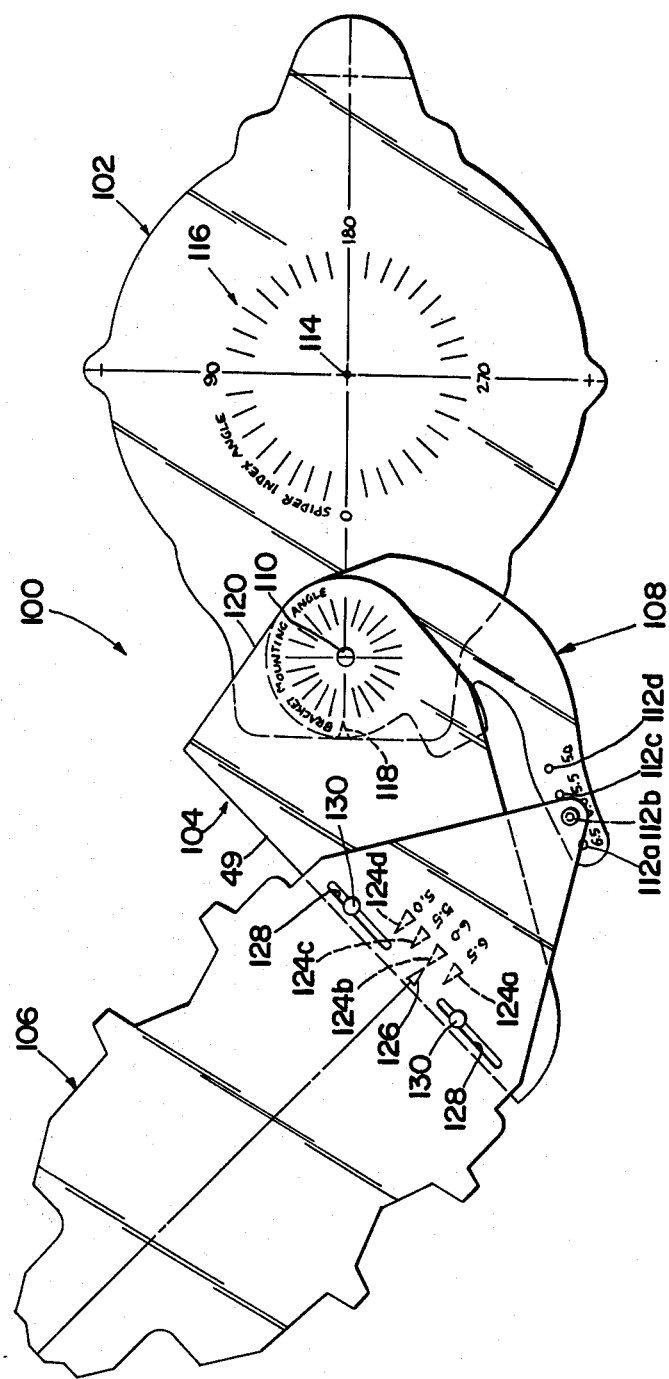
FIG. 3 is a plan view of the template of the present invention.

The multi-member, variable configuration template of the present invention may be seen by reference to FIG. 3. The template 100 is a four member assembly comprising a first member 102 simulating the general shape of the brake spider 14, a second member 104 simulating the general shape of the air chamber mounting bracket 32, a third member 106 simulating the general shape of the air motor 34 and link 36 in the fully extended position, and a fourth member 108 simulating the general shape of the slack adjuster 38. As indicated above, the template members are all to a given scale of the brake assembly components simulated and may be either in the two dimensional shape of the brake assembly components to which they correspond or may be sheets of relatively transparent material, such as plastic or plexiglass, on which the two dimensional outline of the brake component to which they correspond is marked.

The template member 104 corresponding to the air chamber mounting bracket and the template member 108 corresponding to the slack adjuster are pivotably mounted to the template member 102 corresponding to the brake spider at the point 110 on the template member 102 corresponding to the axis of the cam shaft. To allow a single template to be utilized to determine brake assembly mounting variables for brakes having different slack adjusters, a plurality of different fourth members 108 may be pivotably connected to first template member 102. The template member 106 corresponding to the air chamber and link is slidably mounted on the template member 104 corresponding to the air chamber mounting bracket. The template member, or members, 108 corresponding to the automatic or manual slack adjuster is removably attachable to the template member 106 corresponding to the air chamber and link at several finite locations 112a, 112b, 112c and 112d corresponding to commercially available slack adjuster lengths, in this example 6.5, 6.0, 5.5 and 5.0 inches, respectively. The template member 108 corresponding to the slack adjuster, when attached to the template member 106 corresponding to the air chamber and link, assumes a position corresponding to the fully applied position of the brake (see FIG. 2).

The template member 102 corresponding to the brake spider has a point 114 marked therein which indicates the point on the spider 14 which must be aligned with the axis 45 of the vehicle axle shaft. The template member 102 also carries an array 116 of spider angle indicia marks thereon from which the spider index angle may be read when the array is over layed on a scale drawing of a truck having the position of fasteners 16 indicated thereon and point 114 is aligned with the point on the drawing corresponding to the axis of the axle shaft. The template member 102 also carries a pointer 118 which in combination with a cooperating array 120 on template member 104 which is centered on the point 110 corresponding with the axis of the cam shaft may be utilized to read an air motor mounting bracket index angle. Of course, array 120 may be marked on template member 102 and pointer 118 on template member 104. The finite mounting points 112 of the template member 108 to the template member 102 carry indicia of the slack adjuster length corresponding thereto. In similar fashion, template member 104 may have finite markings 124a, 124b, 124c and 124d thereon to be aligned with a pointer 126 on template member 106 to indicate the slack adjuster length corresponding to the relative position of member 106 to member 104.

In operation, the template 100 is utilized as an aid to specify brake assembly mounting variables in combination with a drawing, drawn to same scale as the template, of the space in a particular truck to which the brake assembly is to be mounted, as follows. First, the template member 106 corresponding to the air chamber and link, is disconnected from the template member 108 corresponding to the automatic or manual slack adjuster. The template member 106 is then slidably moved along the template member 104 corresponding to the air chamber mounting bracket until the indicia marks 124 on the template member 104 and the pointer 126 on template member 106 align at the indicia mark corresponding to the slack adjuster length specified for specific torque requirement. To provide this sliding connection, either member 104 or 106 is provided with a slot or slots 128 which slidably receive a pair of connecting members 130 extending from the other member. Preferably, connectors 130 will be snuggly received in slots 128 to prevent undesired relative movement between template members 104 and 106. The template member 106 corresponding to the air chamber and link is then connected to the template member 108 corresponding to the slack adjuster to be utilized at the point 112 on template member 108 corresponding to the preselected slack adjuster length. The connection between template members 108 and 106 may comprise a series of apertures in the template member 108 and a single connector extending from template member 106 for reception in one of the apertures or simply a series of snap connectors of the like. The template 100 is then placed on a scale drawing of the space on a truck available for mounting of the brake assembly with the point 114 on the template member 102 corresponding to the brake spider aligned with the point on the drawing corresponding to centerline of the axle shaft. The template member 102 is then rotated about the point on the drawing corresponding to the centerline or axis of the axle shaft, and the template member 104, 106 and 108 rotated about the pivot connection thereof with template member 102 until a configuration is arrived at which will provide the necessary clearance for installation and operation of the brake assembly. When an acceptable configuration is achieved, the air chamber bracket mounting angle is then read on the bracket angle indicia array 120 aligned with pointer 118 and the brake spider index angle is then determined by reading the array 116 relative to a line drawn from point 114 to the center of the first fastener 16 marked on the drawing clockwise of the point 110, or other datum line passing through the scale drawing of the vehicle space available for mounting of the brake assembly.

Although this invention has been described in its preferred form with a certain degree of particularity, it is understood that the present disclosure of the preferred form has been made only by way of example and that numerous changes in the details of construction and combination and arrangement of the parts may be resorted to without departing from the spirit and the scope of the invention as hereinafter claimed.

I claim:

1. A multi-piece, variable configuration template for determining acceptable brake assembly mounting variables for an air operated, cam actuated brake assembly comprising a brake spider, an air chamber mounting bracket, an air chamber and a slack adjuster to be mounted on a vehicle of known configuration having an axle shaft, said template comprising:

a first template member corresponding to the shape of the brake spider in a given scale, said first member having a first point marked thereon corresponding to the point at which the brake spider must align with the axle shaft of the vehicle to which the brake assembly is to be mounted, a first array of indicia marks on said first member centered on said first point for use with a reference line to determine acceptable angular relationships between the brake spider and the vehicle, said first member having a second point marked thereon corresponding to the centerline of the brake actuating cam;

a second template member corresponding to the shape of the brake air chamber mounting bracket in said given scale, said second member pivotably mounted to said first member about said second point corresponding to the centerline of the brake actuating cam, one of said first and second members having a pointer mark thereon for cooperation with a second array centered about said second point on the other of said first and second members for determination of the angular relationship between said first and said second members;

a third template member corresponding to the shape of the air chamber in said given scale in the fully extended position thereof, said third member slidably mounted on said second member, a second pointer on one of said second and third members for cooperation with a third array on said other of said second and third members for determining the linear position of said third member relative to said second member, said third array indicating linear positions of said third member relative to said second member corresponding to the linear position of an air chamber relative to an air chamber mounting bracket for a given slack adjuster length; and at least one fourth template member corresponding to the shape of the slack adjuster in said given scale, said fourth member pivotably mounted to said first member at said second point corresponding to the centerline of said brake operating cam, said fourth member removably connectable to said third member at various finite points on said fourth member corresponding to various slack adjuster lengths.

2. The template of claim 1 wherein a plurality of fourth members are provided, each of said fourth members corresponding in shape to the shape of a different commercially available slack adjuster.

3. The template of claim 1 wherein said fourth member carries a plurality of removable connectors corresponding to various slack adjuster lengths at which said third member may be connected to said fourth member.

4. The template of claim 3 wherein said fourth member has indicia marks adjacent each of said removable connectors indicating the slack adjuster length represented thereby.

5. The template of claim 1 wherein said reference line is a line drawn from a fastener on said vehicle through said first point.

6. The template of claim 1 wherein said reference line is a datum line fixed relative to said vehicle.

7. The template of claim 1 wherein said sliding connection between said second member and said third member comprises at least one elongated slot provided in one of said second and third members and a plurality of sliding connectors for receipt in said slots extending from the other of said second and third members said slots extending generally parallel to the portion of said second member corresponding to the relative flat mounting face of the air chamber mounting bracket.

8. The template of claim 1 wherein said template members are in the two dimensional shape of the brake assembly components to which they correspond.

9. The template of claim 1 wherein said template members comprise relatively transparent sheets upon which the two dimensional outline of the brake assembly members to which they correspond are marked.

10. A multi-piece, variable configuration template for determination of acceptable brake assembly mounting variables of an air operated, cam actuated brake assembly comprising a brake spider, an air chamber mounting bracket, an air chamber and a slack adjuster to be mounted on a particular vehicle, said template adapted for use in connection with a scale drawing of the space in the vehicle available for mounting the brake assembly, said drawing including a point corresponding to the centerline of the vehicle axle shaft and a plurality of markings indicating the position of fasteners for attachment of the brake spider to the vehicle, said template comprising;

a first template member corresponding to the shape of the brake spider and in the same scale as said drawing, said first member having a first point marked thereon corresponding to the point at which the axis of the vehicle axle shaft must align with the brake spider, a first array of indicia marks on said first member centered around said first point for use in combination with a line through said first point and one of said fasteners marked on said drawing for determining acceptable angular relationships between said brake spider and said vehicle, a second point marked on said first member corresponding to the axis of the brake actuating cam;

a second template member corresponding in shape to said air chamber mounting bracket and in the same scale as said drawing, said second member pivotably connected to said first member about said second point, a second array of indicia marks centered about said second point on one of said first and second members for cooperation with a first pointer mark on the other of said first and second members for determining the angular relationship between said first and second members;

a third template member corresponding in shape to said air chamber in the fully extended position thereof and in the same scale as said drawing, said third member slidably mounted on said second member, a third array of indicia marks on one of said second and third members for cooperation with a second pointer on the other of said second and third members for determining the linear position of said third member relative to said second member, said third array of indicia marks corresponding to positions of said air chamber on said air chamber mounting bracket for a given slack adjuster length; and at least one fourth template member corresponding in shape to said slack adjuster and in the same scale as said drawing, said fourth member pivotably mounted to said first member about said second point, said fourth member removably connectable to said third member at a finite series of connection points corresponding to slack adjuster lengths.

11. The template of claim 10 wherein a plurality of fourth members are provided, each of said fourth members corresponding in shape to the shape of a different commercially available slack adjuster.

12. The template of claim 10 wherein said fourth member carries a plurality of removable connectors corresponding to various slack adjuster lengths at which said third member may be connected to said fourth member.

13. The template of claim 12 wherein said forth member has indicia marks adjacent each of said removable connectors indicating the slack adjuster length represented thereby.

14. The template of claim 10 wherein said sliding connection between said second member and said third member comprises at least one elongated slot provided in one of said second and third members and a plurality of sliding connectors for receipt in said slots extending from the other of said second and third members.

15. The template of claim 10 wherein said template members are in the two dimensional shape of the brake assembly components to which they correspond.

16. The template of claim 10 wherein said template members comprise relatively transparent sheets upon which the two dimensional outline of the brake assembly members to which they correspond are marked.

17. A method for determining the acceptable brake assembly mounting variables for an air operated, cam actuated brake assembly comprising a brake spider, an air chamber mounting bracket, an air chamber and a slack adjuster to be mounted to a vehicle of a given configuration, said method comprising the steps of:

a. providing a scale drawing of the space on the vehicle available for mounting of the brake assembly, said scale drawing having a point marked thereon corresponding to the axis of the vehicle axle shaft and a plurality of markings indicating the position of the fasteners for attaching said spider to said vehicle;

b. providing a multi-piece, variable configuration template, said template comprising;

a first template member corresponding to the shape of the brake spider and in the same scale as said drawing, said first member having a first point marked thereon corresponding to the point at which the axis of the vehicle axle shaft must align with the brake spider, a first array of indicia marks on said first member centered around said first point for use in combination with a reference line passing through said first point and a selected one of said fasteners marked on said drawing for determining acceptable angular relationships between said brake spider and said vehicle, a second point marked on said first member corresponding to the axis of the brake actuating cam;

a second template member corresponding in shape to said air chamber mounting bracket and in the same scale as said drawing, said second member pivotably connected to said first member about said second point, a second array of indicia marks centered about said second point on one of said first and second members for cooperation with a first pointer mark on the other of said first and second members for determining the angular relationship between said first and second members;

a third template member corresponding in shape to said air chamber in the fully extended position thereof and in the same scale as said drawing, said third member slidably mounted on said second member, a third array of indicia marks on one of said second and third members for cooperation with a second pointer on the other of said second and third members for determining the linear position of said third member relative to said second member, said third array of indicia marks corresponding to positions of said air chamber on said air chamber mounting bracket for a given slack adjuster length; and at least one fourth template member corresponding in shape to said slack adjuster and in the same scale as said drawing, said fourth member pivotably mounted to said first member about said second point, said fourth member removably connectable to said third member at a finite series of connection points on said fourth member corresponding to slack adjuster lengths;

c. disconnecting said third template member from said fourth template member;

d. selecting a slack adjuster length;

e. sliding said third member relative to said second member to cause said second pointer to align with the indicia mark on said third array corresponding to the selected slack adjuster length;

f. attaching said third template member to said fourth template member at the connection point corresponding to the predetermined slack adjuster length;

g. placing said template on said vehicle drawing and aligning said first point with said point on said drawing corresponding to the axis of said axle shaft;

h. positioning said first member on said drawing while retaining said first point in alignment with the point on said drawing while rotating said second, third and fourth template members about said second point to determine an acceptable configuration providing the necessary clearance for brake installation and operation;

i. determining an acceptable angular relationship between said second template member and said first template member by reading the value indicated by said first pointer on said second array; and j. determining the angular relationship between said first template member and said vehicle by noting the point on said first array aligned with said reference line when said first point is aligned with said axis of said axle shaft.

18. The method of claim 9 comprising the additional steps of k. providing a plurality of fourth template members each corresponding in shape to a different commercially available slack adjuster; and l. selecting the proper fourth template member for corresponding to the slack adjuster to be utilized in the brake assembly to be mounted to the given vehicle.

* * * * *